(12) United States Patent
Issa

(10) Patent No.: US 8,305,892 B2
(45) Date of Patent: *Nov. 6, 2012

(54) PEER PROXY BINDING

(75) Inventor: Alfredo C Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/772,533

(22) Filed: May 3, 2010

(65) Prior Publication Data

US 2010/0211677 A1    Aug. 19, 2010

Related U.S. Application Data

(63) Continuation of application No. 10/941,673, filed on Sep. 15, 2004, now Pat. No. 7,719,971.

(51) Int. Cl.
*G01R 31/08* (2006.01)
*G06F 15/16* (2006.01)

(52) U.S. Cl. ........ 370/230; 370/235; 709/245; 709/203; 709/219

(58) Field of Classification Search .................. None
See application file for complete search history.

(56) References Cited

U.S. PATENT DOCUMENTS

| | | | |
|---|---|---|---|
| 5,517,617 A | 5/1996 | Sathaye et al. |
| 5,537,586 A | 7/1996 | Amram et al. |
| 5,867,729 A | 2/1999 | Swonk |
| 6,138,159 A | 10/2000 | Phaal |
| 6,151,624 A | 11/2000 | Teare et al. |
| 6,260,069 B1 | 7/2001 | Anglin |
| 6,311,194 B1 | 10/2001 | Sheth et al. |
| 6,330,586 B1 | 12/2001 | Yates et al. |
| 6,389,409 B1 | 5/2002 | Horovitz et al. |
| 6,463,433 B1 | 10/2002 | Baclawski |
| 6,498,795 B1 | 12/2002 | Zhang et al. |
| 6,553,367 B2 | 4/2003 | Horovitz et al. |
| 6,567,122 B1 | 5/2003 | Anderson et al. |
| 6,629,100 B2 | 9/2003 | Morris et al. |
| 6,741,853 B1 | 5/2004 | Jiang et al. |
| 6,772,160 B2 | 8/2004 | Cho et al. |
| 6,785,704 B1 | 8/2004 | McCanne |

(Continued)

OTHER PUBLICATIONS

Klyne, G., et al., editors; "Composite Capability/Preference Profiles (CC/PP): Structure and Vocabularies"; copyright 2004 World Wide Web Consortium (W3C), published Jan. 15, 2004, http://www.w3.org/TR/2004/REC-CCPP-struct-vocab-200401151, 71 pages.

(Continued)

*Primary Examiner* — Hassan Phillips
*Assistant Examiner* — Hicham Foud
(74) *Attorney, Agent, or Firm* — Withrow & Terranova, PLLC

(57) ABSTRACT

A method for connecting a guest browser with a proxy is provided. The method includes sending a registration request for a proxy from a peer to a proxy director and selecting a proxy by the proxy director and sending a proxy name to the peer. The method also includes sending a registration request with a peer name and the proxy name from the peer to a dynamic domain name server (DNS) and registering a dynamic DNS record with a DNS name server by the dynamic DNS to associate the peer name with the proxy name. The dynamic DNS converts the registration request from the peer to standard DNS. When a guest browser wants to connect to the peer, a standard DNS look-up is performed for the peer name at the DNS name server, which provides information regarding proxy connection.

13 Claims, 4 Drawing Sheets

U.S. PATENT DOCUMENTS

| | | |
|---|---|---|
| 6,839,680 B1 | 1/2005 | Liu et al. |
| 6,854,069 B2 | 2/2005 | Kampe et al. |
| 6,915,129 B1 | 7/2005 | Kovacs |
| 6,917,944 B1 | 7/2005 | Prasad et al. |
| 6,941,148 B2 | 9/2005 | Hansmann et al. |
| 6,970,840 B1 | 11/2005 | Yu et al. |
| 6,980,993 B2 | 12/2005 | Horvitz et al. |
| 7,072,982 B2 | 7/2006 | Teodosiu et al. |
| 7,120,681 B2 | 10/2006 | Frelechoux et al. |
| 7,526,458 B2 | 4/2009 | Flinn et al. |
| 7,594,244 B2 | 9/2009 | Scholl et al. |
| 7,685,135 B2 | 3/2010 | Brooke et al. |
| 7,716,220 B2 | 5/2010 | Michelitsch et al. |
| 2002/0052885 A1 | 5/2002 | Levy |
| 2002/0078206 A1 | 6/2002 | Boies et al. |
| 2002/0152322 A1 | 10/2002 | Hay |
| 2002/0156875 A1 | 10/2002 | Pabla |
| 2002/0156893 A1 | 10/2002 | Pouyoul et al. |
| 2002/0156917 A1 | 10/2002 | Nye |
| 2003/0002521 A1 | 1/2003 | Traversat et al. |
| 2003/0028395 A1 | 2/2003 | Rodgers et al. |
| 2003/0046587 A1 | 3/2003 | Bheemarasetti et al. |
| 2003/0061282 A1 | 3/2003 | Ebata et al. |
| 2003/0078858 A1 | 4/2003 | Angelopoulos et al. |
| 2003/0120662 A1 | 6/2003 | Vishik |
| 2003/0120680 A1 | 6/2003 | Agrawal et al. |
| 2003/0163597 A1 | 8/2003 | Hellman et al. |
| 2003/0179228 A1 | 9/2003 | Schreiber et al. |
| 2003/0204605 A1 | 10/2003 | Hudson et al. |
| 2004/0024720 A1 | 2/2004 | Fairweather |
| 2004/0044727 A1 | 3/2004 | Abdelaziz et al. |
| 2004/0064568 A1 | 4/2004 | Arora et al. |
| 2004/0064693 A1 | 4/2004 | Pabla et al. |
| 2004/0073659 A1 | 4/2004 | Rajsic et al. |
| 2004/0110497 A1 | 6/2004 | Little |
| 2004/0122958 A1 | 6/2004 | Wardrop |
| 2004/0148434 A1 | 7/2004 | Matsubara et al. |
| 2004/0162871 A1 | 8/2004 | Pabla et al. |
| 2004/0181540 A1 | 9/2004 | Jung et al. |
| 2004/0203685 A1 | 10/2004 | Woodward et al. |
| 2004/0214560 A1 | 10/2004 | Date et al. |
| 2004/0220893 A1 | 11/2004 | Spivack et al. |
| 2005/0013298 A1 | 1/2005 | Srisuresh et al. |
| 2005/0034107 A1 | 2/2005 | Kendall et al. |
| 2005/0048961 A1 | 3/2005 | Ribaudo et al. |
| 2005/0128995 A1 | 6/2005 | Ott et al. |
| 2005/0154701 A1 | 7/2005 | Parunak et al. |
| 2005/0163135 A1 | 7/2005 | Hopkins |
| 2005/0198290 A1 | 9/2005 | Berkey et al. |
| 2005/0229243 A1 | 10/2005 | Svendsen et al. |
| 2005/0256876 A1 | 11/2005 | Eidson |
| 2005/0262246 A1 | 11/2005 | Menon et al. |
| 2006/0009204 A1 | 1/2006 | Ophir |
| 2006/0010225 A1 | 1/2006 | Issa |
| 2006/0015868 A1 | 1/2006 | Rechterman et al. |
| 2006/0143084 A1 | 6/2006 | Donnelli et al. |
| 2006/0184997 A1 | 8/2006 | La Rotonda et al. |
| 2008/0016081 A1 | 1/2008 | MacMillan et al. |

OTHER PUBLICATIONS

McGuinness, D., et al., "OWL Web Ontology Language—Overview", (article), Feb. 10, 2004, 19 pages, copyright 2004 World Wide Web Consortium (W3C), http://www.w3.org/TR/2004/REC-owl-features-20040210.

Loo, B.T., et al., "The Case for a Hybrid P2P Search Infrastructure," (PowerPoint presentation), Feb. 26, 2004, 29 pages, In Procedures of the 3rd International Workshop on Peer-to-Peer Systems (IPTPS), UC Berkeley, San Diego, CA, http://db.cs.berkeley.edu/papers/iptps04-hybridsearch.pdf.

Yang, B., et al., "Designing a Super-Peer Network," (article), 2003, 15 pages, ICDE, 19th International Conference on Data Engineering (ICDE'03).

Non-Final Office Action mailed May 12, 2008 issued by the Patent Office during the prosecution of for U.S. Appl. No. 10/941,673. 12 pages.

Non-Final Office Action mailed Nov. 25, 2008 issued by the Patent Office during the prosecution for U.S. Appl. No. 10/941,673. 10 pages.

Non-Final Office Action mailed Jul. 27, 2009 issued by the Patent Office during the prosecution for U.S. Appl. No. 10/941,673. 20 pages.

Notice of Allowance mailed Jan. 7, 2010 issued by the Patent Office during the prosecution for U.S. Appl. No. 10/941,673. 18 pages.

Supplemental Notice of Allowability mailed Feb. 24, 2010 issued by the Patent Office during the prosecution for U.S. Appl. No. 10/941,673. 8 pages.

PEER PROXY BINDING

CROSS-REFERENCE TO RELATED APPLICATION

This application is a Continuation of application Ser. No. 10/941,673, filed Sep. 15, 2004, currently pending, the specification of which is incorporated herein by reference in its entirety.

FIELD OF INVENTION

The present invention relates to peer-to-peer services, and more particularly to the binding of peers to proxies in a peer-to-peer network.

BACKGROUND OF THE INVENTION

FIG. 1 illustrates a conventional Internet-based client-to-client communication network. The network includes a central server or proxy 102, a client or peer 101, and a guest 103. Any large distributed Internet-based service where there is client-to-client communication, such as instant messaging, uses centralized servers. The client 101 selects a central server 102 from a band of central servers, using some load balancing mechanism, and then registers with that server. When a guest 103 attempts to connect to the client 101 via the central server 102, the guest 103 uses a proprietary tool and a proprietary locator service to find which central server 102 to use to connect to the client 101.

However, because the tools and locator services are proprietary in nature, the guest 103 cannot connect to the client 101 using a standard web browser, as the standard web browser would not know how to communicate with the proprietary tools and services. This limits the ease guest access to shared image files.

Accordingly, there exists a need for an improved method and system for connecting a guest browser with a proxy. The method and system should not use any proprietary tools or services to find and connect to the proxy. The present invention addresses such a need.

SUMMARY OF THE INVENTION

A method and system for connecting a guest browser with a proxy includes: sending a registration request for a proxy from a peer to a proxy director; selecting a proxy by the proxy director and sending a proxy name to the peer; sending a registration request with a peer name and the proxy name from the peer to a dynamic domain name server (DNS); and registering a dynamic DNS record with a DNS name server by the dynamic DNS to associate the peer name with the proxy name. Thus, the dynamic DNS is used to convert the registration request from the peer to standard DNS. When a guest browser wants to connect to the peer, it performs a standard DNS look-up for the peer name at the DNS name server, which tells it which proxy to connect to. No proprietary locator service is needed to accomplish this connection.

DETAILED DESCRIPTION

The present invention provides an improved method and system for connecting a guest browser with a proxy. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
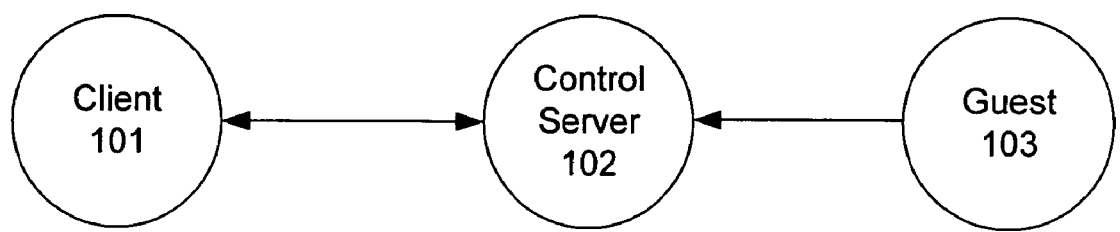
FIG. 1 illustrates a conventional Internet-based client-to-client communication network.
Figure 2:
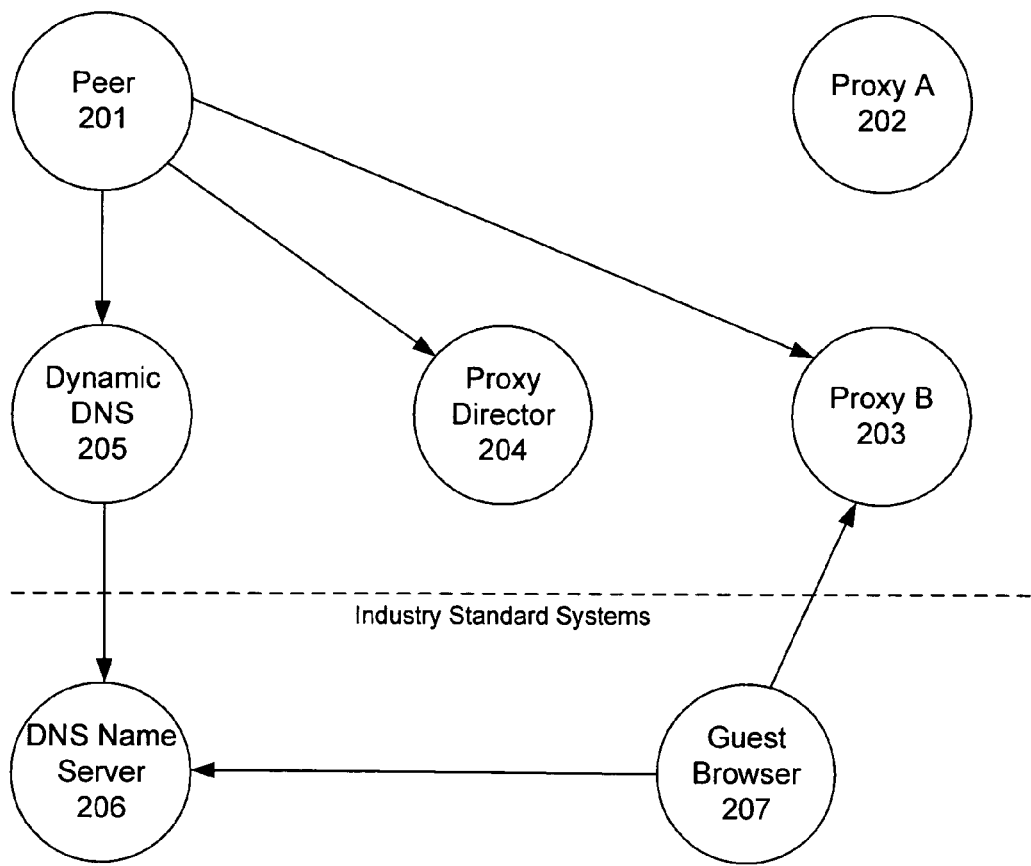
FIG. 2 illustrates a preferred embodiment of a system for connecting a guest browser with a proxy in accordance with the present invention.

FIG. 2 illustrates a preferred embodiment of a system for connecting a guest browser with a proxy in accordance with the present invention. The system includes a peer 201, a plurality of proxies, including Proxy A 202 and Proxy B 203, a proxy director 204, and a dynamic domain name server (DNS) 205. The peer 201 can be a photo sharing application residing on the peer owner's desktop, such as a photo sharing application. One of the proxies, such as Proxy B 203, can represent the peer 201 to a guest using a standard web browser 207. The proxy director 204 selects which proxy to which the peer 201 should bind. The dynamic DNS server 205 is responsible for issuing a request to a DNS name server 206 to bind the peer domains to the proxy domains. With the present invention, the peer 201 binds to an available proxy, where the guest browser 207 knows which proxy to visit in order to find the images hosted by the peer 201 via the proxy. This is described further below with reference to FIG. 3.

Figure 3:
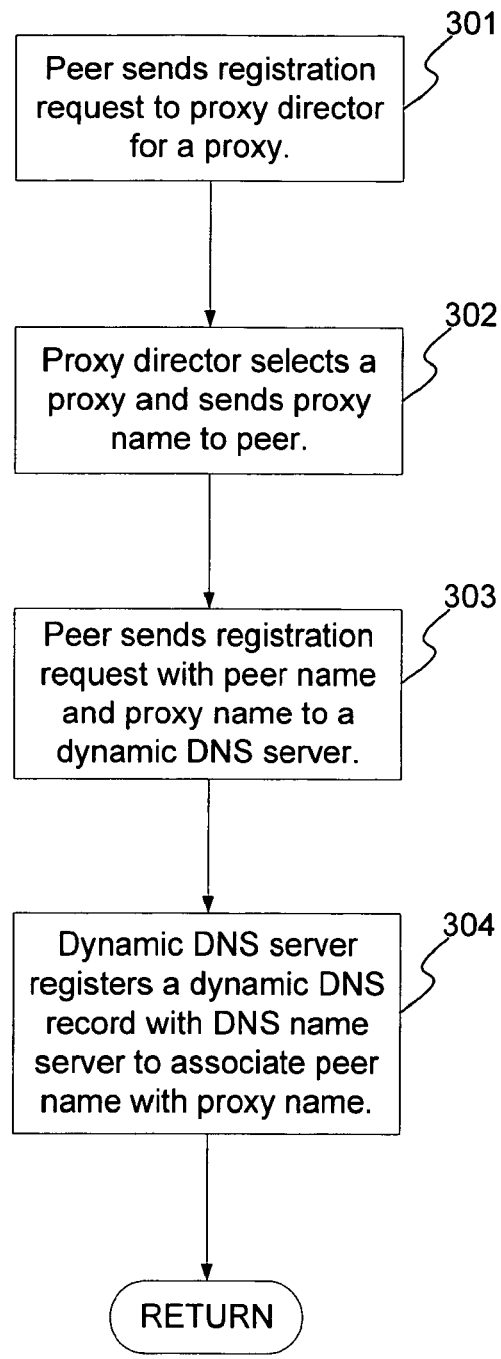
FIG. 3 is a flowchart illustrating a preferred embodiment of a method for connecting a guest browser with a proxy in accordance with the present invention.

FIG. 3 is a flowchart illustrating a preferred embodiment of a method for connecting a guest browser with a proxy in accordance with the present invention. First, the peer 201 sends a registration request to the proxy director 204 for a proxy, via step 301. The proxy director 204 then selects one of the proxies 202-203, and sends the proxy name to the peer 201, via step 302. In this embodiment, the proxy director 204 determines which proxy has the least load and responds by returning the Internet domain name of the proxy.

Once the peer 201 knows which proxy to bind to, it sends a registration request with the peer name and proxy name to the dynamic DNS server 205, via step 303. In this embodiment, the proxy 201 sends an encrypted tuple to the dynamic DNS server 205 of the form: Peer Name, Proxy Domain Name. Peer Name represents a mapping of the name of the peer chosen by the peer owner during peer registration. The Proxy Domain name represents the proxy to which the peer 201 will bind as returned by the proxy director 204.

Once the dynamic DNS server 205 receives the peer name and proxy name, it registers a dynamic DNS record with the standard DNS name server 206 to associate the peer name with the proxy name, via step 304. In this embodiment, the dynamic DNS server 205 receives the tuple from the proxy 203 and stores it in its internal database. If this is a new mapping, it generates an Internet standard dynamic DNS update request to the standard DNS name server 206, which essentially creates an alias from a domain name constructed for the peer 201 to the domain name of the proxy to which it is bound.

In this manner, the dynamic DNS 205 is used to convert the registration request from the peer 201 to standard DNS. Thus, when a guest browser 207 wants to connect to the peer 201, it performs a standard DNS look-up for the peer name at the DNS name server 206, which tells it which proxy to connect to. No proprietary locator service is needed to accomplish this connection.

For example, assume that the name for the peer 201 is JoesPhotos.Quirophotos.com, and the name for Proxy B 203 is proxyB.quiro.com. On initialization, the peer 201 sends a registration request to the proxy director 204 for a proxy, via step 301. The proxy director 204 determines that Proxy B 203 has the lightest load and returns the proxy name, "proxyB.quiro.com", to the peer 201, via step 302. The peer 201 then sends a registration request with JoesPhotos.Quirophotos.com and proxyB.quiro.com to the dynamic DNS server 205, via step 303. The dynamic DNS server 205 registers a record with the DNS name server 206, via step 304. This record is a CNAME record type which associates JoesPhotos.Quirophotos.com with proxyB.quiro.com. The peer 201 then establishes a connection with Proxy B 203, announcing that it is ready to receive requests.

Thus, when a guest wishes to visit the peer 201, he goes to the Uniform Resource Locator (URL) http://JoesPhotos.Quriophotos.com using his web browser 207. The guest browser 207 resolves the peer name, JoesPhotos.Quirophotos.com, with the DNS name server 206, which resolves to proxyB.quiro.com for Proxy B 203. The HTTP request then goes to Proxy B 203, which converts the request to a proprietary protocol and services it.

Load Balancing

In selecting a proxy for the peer to connect to, via step 302, the proxy director 204 maintains an internal table of all the active proxies. Several variables which may be associated with each proxy in the proxy table, including:

C=CPU capacity for the proxy host system, where C=(number of CPUs)×(Average CPU speed in MHz).

P=number of assigned peers to the proxy.

W=(Average number of daily GB served by the proxy over the last 7 days)/P

For each proxy, the proxy director 204 calculates the load, L, based on the following formula:

$$L=(P/C)+(W \times 0.01)$$

When the proxy director 204 responds to a request for a proxy from a peer 201, the proxy director 204 looks in its internal load table and returns a reference to the proxy with the smaller L.

Error Handling

Figure 4:
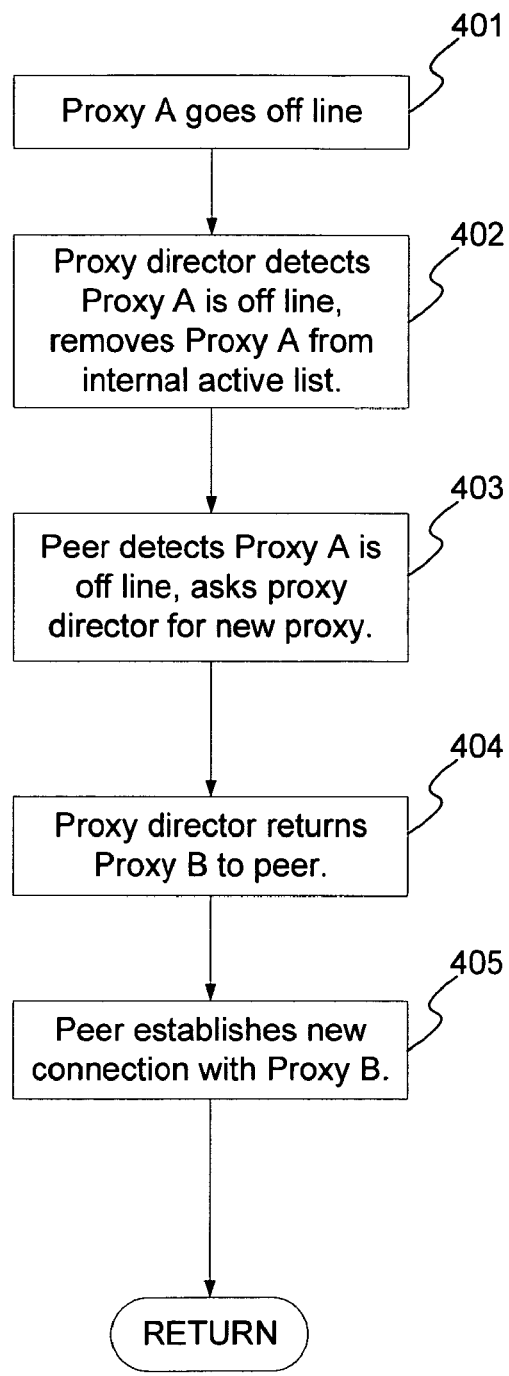
FIG. 4 is a flowchart illustrating error handling in the method for connecting a guest browser with a proxy in accordance with the present invention.

The proxy director 204 also has the capability to remove proxies from its active list, either because it detects that a proxy is not responding or is inactive, or by many intervention (such as to take a proxy off line for maintenance). FIG. 4 is a flowchart illustrating error handling in the method for connecting a guest browser with a proxy in accordance with the present invention. First, a proxy (such as Proxy A 202) goes off-line, via step 402. The proxy director 204 detects that Proxy A 202 is off line, via step 402, and removes Proxy A from its internal active list. The peer 201 then detects that Proxy A 202 is off-line, via step 403, and asks the proxy director 204 for a proxy. The proxy director will then assign a new proxy (such as Proxy B 203) to the peer 201, via step 404. The peer 201 then establishes a new connection with Proxy B 203, via step 405, as set forth above.

An improved method and system for connecting a guest browser with a proxy has been disclosed. The method and system sends a registration request for a proxy from a peer to a proxy director, selects a proxy by the proxy director and sending a proxy name to the peer, sends a registration request with a peer name and the proxy name from the peer to a dynamic DNS, and registering a dynamic DNS record with a DNS name server by the dynamic DNS to associate the peer name with the proxy name. In this manner, the dynamic DNS is used to convert the registration request from the peer to standard DNS. Thus, when a guest browser wants to connect to the peer, it performs a standard DNS look-up for the peer name at the DNS name server, which tells it which proxy to connect to. No proprietary locator service is needed to accomplish this connection.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for connecting a guest browser with a proxy, comprising:

sending a registration request for a proxy from a peer to a proxy director;

receiving a proxy name for the proxy having a least load selected by the proxy director, wherein the proxy is selected by:

determining a load for each proxy of a plurality of proxies;

selecting the proxy with the least load, wherein the load is a function of a number of peers assigned to the proxy, a central processing unit capacity of the proxy, and the amount of data served by the proxy over a period of time; and sending a registration request with a peer name and the proxy name from the peer to a dynamic domain name server (DNS), wherein the dynamic DNS registers a dynamic DNS record with a DNS name server to associate the peer name with the proxy name.

2. The method of claim 1, wherein the method further comprises:

registering the dynamic DNS record with a standard DNS name server to associate the peer name with the proxy name.

3. The method of claim 2, wherein the method further comprises:

receiving a tuple from the proxy by the dynamic DNS;

storing the tuple in an internal database by the dynamic DNS;

determining if the association of the peer name with the proxy name is a new association; and generating a standard dynamic DNS update to the DNS name server, if the association is a new association.

4. The method of claim 1, further comprising:

detecting that the proxy has gone offline by the proxy director;

removing the proxy from an internal active list by the proxy director;

detecting that the proxy has gone offline by the peer;

requesting a new proxy from the proxy director by the peer;

returning the new proxy to the peer by the proxy director; and establishing a new connection with the new proxy by the peer.

5. The method of claim 1, wherein the peer directly sends the registration request for the proxy to the proxy director.

6. The method of claim 1, wherein the peer directly sends the registration request with the peer name and the proxy name to the dynamic DNS.

7. A non-transitory computer readable storage medium storing computer executable instructions for connecting a guest browser with a proxy when executed by a computer comprising:
   sending a registration request for a proxy from a peer to a proxy director;
   receiving a proxy name for the proxy having a least load selected by the proxy director, wherein the proxy is selected by:
      determining a load for each proxy of a plurality of proxies;
      selecting the proxy with the least load, wherein the load is a function of a number of peers assigned to the proxy, a central processing unit capacity of the proxy, and the amount of data served by the proxy over a period of time; and
   sending a registration request with a peer name and the proxy name from the peer to a dynamic domain name server (DNS), wherein the dynamic DNS registers a dynamic DNS record with a DNS name server to associate the peer name with the proxy name.

8. The medium of claim 7, further comprising:
   registering the dynamic DNS record with a standard DNS name server to associate the peer name with the proxy name.

9. The medium of claim 8, further comprising:
   receiving a tuple from the proxy by the dynamic DNS;
   storing the tuple in an internal database by the dynamic DNS;
   determining if the association of the peer name with the proxy name is a new association; and
   generating a standard dynamic DNS update to the DNS name server, if the association is a new association.

10. The medium of claim 7, further comprising:
    detecting that the proxy has gone offline by the proxy director;
    removing the proxy from an internal active list by the proxy director;
    detecting that the proxy has gone offline by the peer;
    requesting a new proxy from the proxy director by the peer;
    returning the new proxy to the peer by the proxy director; and
    establishing a new connection with the new proxy by the peer.

11. A system, comprising:
    a peer;
    a plurality of proxies;
    a proxy director adapted to:
    receive a registration request from the peer;
    determine a load for each proxy of a plurality of proxies;
    select the proxy with a least load; and
    send the proxy name of the proxy with the least load to the peer, wherein the load is a function of a number of peers assigned to the proxy, a central processing unit capacity of the proxy, and the amount of data served by the proxy over a period of time; and
    a dynamic domain name server (DNS), wherein the dynamic DNS receives the registration request from the peer with a peer name and the proxy name, wherein the dynamic DNS registers a dynamic DNS record with a DNS name server to associate the peer name with the proxy name.

12. The system of claim 11, wherein when the proxy director detects that the proxy has gone offline, the proxy director removes the proxy from an internal active list.

13. The system of claim 11, wherein when the peer detects that the proxy has gone offline, the peer requests a new proxy from the proxy director.

* * * * *